US007658993B2

(12) United States Patent
Dronzek, Jr. et al.

(10) Patent No.: US 7,658,993 B2
(45) **Date of Patent: *Feb. 9, 2010**

(54) CARD INTERMEDIATES

(75) Inventors: Peter J. Dronzek, Jr., Thornwood, NY (US); Joseph R. Gervais, N. Granby, CT (US)

(73) Assignee: Polymeric Converting LLC, Enfield, CT (US)

( * ) Notice: Subject to any disclaimer, the term of this patent is extended or adjusted under 35 U.S.C. 154(b) by 61 days.

This patent is subject to a terminal disclaimer.

(21) Appl. No.: 10/505,392

(22) PCT Filed: Feb. 14, 2003

(86) PCT No.: PCT/US03/04765

§ 371 (c)(1), (2), (4) Date: Aug. 20, 2004

(87) PCT Pub. No.: WO03/074293

PCT Pub. Date: Sep. 12, 2003

(65) Prior Publication Data

US 2005/0147781 A1 Jul. 7, 2005

(51) Int. Cl.
*B32B 7/12* (2006.01)

(52) U.S. Cl. ...................................... 428/343; 428/354

(58) Field of Classification Search ................ 428/343, 428/354

See application file for complete search history.

(56) References Cited

U.S. PATENT DOCUMENTS 3,405,052 A * 10/1968 Schirmer ............... 422/186.05
3,531,314 A * 9/1970 Witmer, Jr. et al. ......... 430/505
3,702,258 A * 11/1972 Gibbons et al. ............. 427/536
4,024,038 A * 5/1977 Luc ............................ 204/168
4,060,168 A 11/1977 Romagnoli
4,398,985 A 8/1983 Eagon
4,479,838 A 10/1984 Dunsim
4,840,270 A * 6/1989 Caputo et al. ............... 206/205
4,879,430 A * 11/1989 Hoffman ................... 428/35.1
5,019,436 A 5/1991 Schramer
5,130,804 A 7/1992 Tamura et al.
5,139,804 A 8/1992 Hoffman
5,350,612 A 9/1994 Stern
5,466,013 A 11/1995 Garrison
5,589,025 A 12/1996 Garrison
5,736,212 A 4/1998 Fischer
5,782,497 A 7/1998 Casagrande
6,066,378 A 5/2000 Morii
6,190,747 B1 2/2001 Fischer
6,270,870 B1 8/2001 Chess
6,328,340 B1 12/2001 Fischer
6,780,484 B2 8/2004 Kobe
7,045,186 B2 5/2006 Grabau
2001/0015554 A1 8/2001 Casagrande
2002/0000718 A1 1/2002 Schwarzbauer
2005/0147781 A1 7/2005 Dronzek

OTHER PUBLICATIONS

European Search Report dated Jul. 25, 2008.

* cited by examiner

*Primary Examiner*—Victor S Chang
(74) *Attorney, Agent, or Firm*—James V. Costigan; Hedman & Costigan, P.C.

(57) ABSTRACT

A card intermediate, as for identification, which includes a business from having one or more selectively-pattern-treated laminae diecut into it and adhesively secured to a film.

9 Claims, 4 Drawing Sheets

CARD INTERMEDIATES

FIELD OF THE INVENTION

This invention relates to card intermediates, as for identification, which include a business form having one or more selectively-patterned-corona, flame or plasma-treated laminae diecut and adhesively secured to a film to provide removable pieces from an integrated form.

BACKGROUND OF THE INVENTION

Garrison, U.S. Pat. Nos. 5,466,013 and 5,589,025, describes card intermediates which include a business form having one or more cards diecut into it and backed by a complex laminate of multi-ply film. Removability of the card is accomplished by splitting an adhesive interface in the backing by employing a rupturable adhesive. Some of the splittable adhesive randomly stays with the form and some of it goes with the card. It is not universally acceptable to have the adhesive split randomly and transfer either way for aesthetic purposes where the adhesive residue mars the graphics on the card.

Fischer, U.S. Pat. No. 5,736,212, describes card intermediates which include a business form having one or more cards diecut into it and backed by a complex laminate of multi-ply film and/or paper. Removability of the card is accomplished by employing a "peel-glue" adhesive that exhibits a removable adhesive property at the interface of the removable piece and a permanent adhesive property that adheres the adhesive solely to the form when the piece is removed. All of the adhesive stays with the base layer that remains attached to the form after the diecut piece is removed. This invention is not universally accepted because while not very sticky, the adhesive still retains slight tack in the commercial product sold. When a form is stored tight in a file with other materials, especially smooth papers and films that are pressed in intimate contact with the peel adhesive, clinging between the forms can occur. Deadening the adhesive further could result in possible pre-release of the card as the integrated card is made in the form or the finished form is handled (folded, inserted into a mailer, etc.) in normal handling. Since all of the adhesive stays in the form after removal of the card, signature compatibility on the back of the form is not universally acceptable.

Casagrande, U.S. Pat. No. 5,782,497, describes card intermediates which include a business form having one or more cards diecut into it and backed by a complex laminate of multi-ply film and/or paper. Removability of the card is accomplished by transferring the adhesive interface to the backing by employing a deadening coated film (release) layer on top of a permanent adhesive. All of the permanent adhesive with the release layer adhered to it and transferred over it as a deadening layer staying with the form when removed. It is not universally acceptable to have the release layer stay with the form if the card is to be written on (signature compatible). The commercial product sold under this patent uses dry adhesive edges (no adhesive) to act as lift tabs at the card edge. They are used to begin to lift the release layer (that has tight adhesion to hold the card in the form) off of the card. This is done to facilitate transfer of the adhesive and release layer to the form without tearing the paper remaining in the form because there is not an easy release area at some point at the card edge.

Casagrande, U.S. Published Patent Application No. 20010015554 A1 Aug. 23, 2001, describes card intermediates which include a business form having one or more cards diecut into it and backed by a laminate of multi-ply film.

Removability of the card is accomplished by transferring the adhesive interface with coated film release layer covering the permanent adhesive as a deadening agent to the back of the card. All of the permanent adhesive and the release layer stays with the card and cures to a solid film after drying that produces a signature compatible card that can be written on.

Schwarzbauer, U.S. Published Patent Application No. 20020000718 A1 Jan. 3, 2002, describes card intermediates which include a business form with a multi-layered laminate patch secured to the base paper layer having one or more cards diecut into it. The laminate has a primary film layer having top and bottom surfaces and a periphery, which is preferably chemically and mechanically bonded directly to a layer of breakaway coating. The bond between the breakaway coating and primary film layer is designed to release and allow the layers to separate. The advantage of the invention is the breakaway layer composition which is applied as a liquid and cures to a solid and is applied in varied patterns or thicknesses or may be chemically varied in patterns using different compounds in areas across the card when coated in order to allow variation in peel strengths in different areas of the primary film layer. One embodiment incorporates an area with an increased peel strength or tighter release in the center of the laminated card with an area of weaker peel strength at the outside edge of the patch positioned such that the die cut for the card will extend ¼" beyond the center zone of the patch with the tight release. This positions the edge of the card in the area of the card with the easy release. Another embodiment teaches a pattern in either the adhesive coating or breakaway layer while another teaches the use of tighter areas on the edges just outside the perimeter of the diecut card with easy release in the card area. The invention works in concept but in production the process is difficult to control in terms of different degrees of peel strength across a film being pattern coated by using different thicknesses of coating as coating rolls wear and coating weight changes due to foam or temperature changes during a coating run. In addition, without controlling dyne level, changes in the natural dyne level of the incoming primary web which can vary in excess of 4 dynes produce inconsistent results. Following the teaching of using different compounds which must be applied in a registered pattern complicates the manufacturing process of the laminate. In addition, using multiple coating stations further complicates the process and increases the cost which is not desirable. Not only is the process of manufacturing the laminate complicated, secondary slitting of smaller rolls out of a master must be done in register to the pattern which is difficult and time consuming. Lastly, the end user producing the form must die cut in register to the coated pattern of different coat weights, patterned adhesive or breakaway coating or areas of different coated chemistry. A more universally manufacturable and useable product where a user could cut anywhere in the patch to begin removal of the card is preferred.

Fischer, U.S. Pat. No. 6,328,340 describes a "peeling adhesive" as also detailed in the U.S. Pat. No. 5,736,212 with an adhesive layer or layers that transfer to the back of the card instead of staying in the form. The novelty of the technology of U.S. Pat. No. 6,328,340 is that the peel glue layer can receive indicia which corrects for the short-coming of U.S. Pat. No. 5,736,212 technology not being signature compatible without the use of a separate pre-coating of a film layer as in Casagrande 20010015554. Fischer provides detail on the "peel glue" or "peeling adhesive" that has the dual function of adhesive and signature compatibility layer. The peeling adhesive system achieves the differential adhesive effects by pretreatment using plasma, corona or flame treatment on the film layer where the bond is permanent (can not be peeled) and no treatment on the film for the other layer where the bond is not permanent (peelable). The peeling adhesive can have the same issues of tack as discussed above. Test cards made from substrate and peel adhesive obtained commercially that were placed in a wallet with other cards as will be done in practice showed that the peel glue will stick to another card. While it can be re-peeled and removed, this is not universally acceptable.

Hoffman, U.S. Pat. No. 4,879,430, and its divisional, U.S. Pat. No. 5,130,804 (both having in the meantime expired), disclose and claim a method of making plastic web materials which are selectively treated in a patterned manner with corona discharge for forming into containers. The variable corona pattern described in the Hoffman Patents was intended to create areas of weak sealability or bond of thermally sealable adhesive layers in the areas of treatment.

The present state of the art shows that easy lift cards can be integrally formed by diecutting multilayer laminates if one is willing to use extra steps and materials and that a single layer will suffice if one is willing to turn the business form over and punch the card out without leaving a layer in the form. One could use cards with a peel glue where a slight tack can remain on the form or the back of the card. Furthermore, an alternative approach is available if adhesives of two different strengths are used, or by patterning the adhesive, or by using a deadener, or even by using a patterned adhesive release deadener with a permanent adhesive, or cured breakaway coatings using different application patterns, different compounds in multiple applications or different thicknesses or areas of no breakaway or adhesive to achieve different peel strength characteristics.

The use of patterned adhesives, patterned release layers, multiple adhesives, selectively cured adhesives, release coatings, peel adhesives cured breakaway coatings using different application patterns, different compounds in multiple applications or different thicknesses or areas of no breakaway or adhesive to achieve different peel strength characteristics or combinations of the forgoing to create different levels of release. Sufficient adhesion on corona treated or non corona treated film layers has been necessary in the prior art to create removable but firmly adherent integrated cards to ensure that the card can be easily lifted at an edge to begin to disengage the card from the form, while other areas of the card patch integrated with the form have a tighter releasable bond than the lift area to maintain adhesion of the card to the form. This is necessary after die cutting so the card does not prematurely remove from the form due to the significant stiffness difference between the laminated card area in contrast to stiffness of the remaining base layer as the form is processed, folded, inserted and handled through automatic mail processing equipment. If the adhesion of the card at the interface with the layer remaining in the form is too loose, the card can prematurely remove in processing before reaching the end user. If the adhesion of the card is too tight, lifting and edge and removabilty is difficult which can result in damage to the card or form during attempted removal of the card.

This invention provides for an improved process for making an integrated card by simplifying the process by using areas of variable surface treatment alternating from higher treatment level (dyne level) in judiciously selected patterns on the same layer of film (not different layers as in Fischer). Variable treatment is defined as the application of different energy levels to the surface of a polymer substrate in a variety of patterns. The invention provides for easy separation of adhesive bonding layers (Fischer) or adhesive and deadening release agent (Casagrande) in any area of the card without the use of special "peel adhesives", patterned adhesives, cured breakaway coatings using different application patterns, different compounds in multiple applications, different thicknesses, areas of no breakaway or adhesive to achieve different peel strength characteristics, patterned release deadening layers, splittable adhesives or combinations while producing an easily separable but firmly adherent card. The variable degree of separation strength in lesser- or non-treated areas allows for easy "pop" or separation of the layers in that area while securely bonding in higher treatment areas for controlled separation force. The terms "pop" and "separation force" strength mean respectively; the ability of a laminate to lift an edge to disengage from or "pop" free of another layer; the "separation" force or strength required to remove the card once it has been disengaged.

It has now been found that making a business form having an integral and removable portion is unexpectedly improved if at least one of the films used as laminae with the form is patterned in a judicious way during treatment to produce alternating areas of easy and tight separation strength of adhesives or release/deadening layers to allow for ease of removability with firm controlled separation.

It has also been found that the process for making the forms with removable cards is simplified, and an improved card is obtained, if a patterned "treated area" is caused to develop on the substrate in at least the shape of the card. A universal treatment pattern is defined for purposes of this invention as a pattern that will allow for easy separation of a perimeter die cut card at any area in an integrated laminate form while providing sufficient adhesion to prevent pre-separation of the die cut card during normal handling and processing, regardless of whether or not patterned or full coverage adhesives, release coatings, deadening agents, cured breakaway coatings, different application patterns, different compounds in multiple applications or different thicknesses or areas of no breakaway or adhesive are used to achieve different peel strength characteristics. Release or deadening layers in this art are also known as breakaway or fugitive layers that release or breakaway from one layer and transfer to a second layer to facilitate separation of the layers as defined in Casagrande. These layers do not "peel" in the classic sense of the art as an adhesive system does, rather they "breakaway" and become fugitive once the area of tightest bond has separated and removal force is applied.

Accordingly, a principal object of the present invention is to provide for the use of intermediates to make cards for use without the problems discussed above.

These and other objects of the invention will become apparent from the present specification.

SUMMARY OF THE INVENTION

Figure 1:
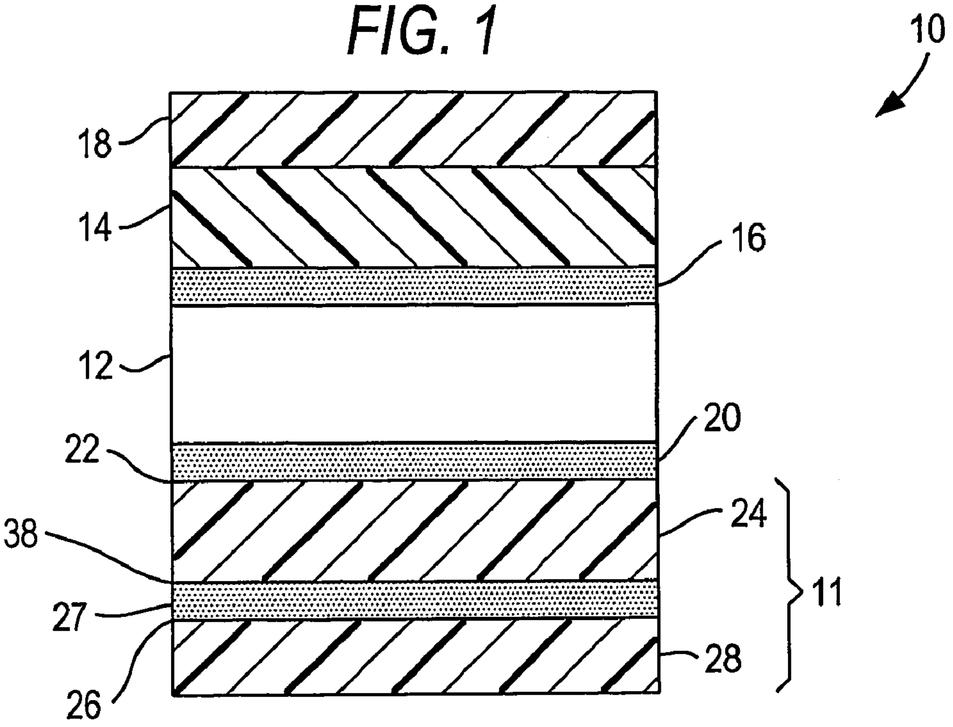
FIGS. 1 and 1A are cross-section views of card intermediates constructed in accordance with the present invention.

According to this invention, there is provided a card intermediate, comprising:

(i) a business form layer of paper or polymer film having an upper surface and a lower surface;

(ii) optionally, a first thin polymer film layer, adhesively secured to the upper surface of said business form layer;

(iii) a second thin polymer film layer having an upper surface and a lower surface, the upper surface being permanently adhesively secured to the lower surface of said business form layer, thereby providing the lower surface of the second thin polymer film layer with a permanent interface A;

(iv) a third thin polymer film layer having an upper surface and a lower surface, the upper surface being adhesively secured, directly, or through an underlying thin coated layer to the lower permanently bonded interface A of said second thin polymer film layer (iii) at a separable interface B; and (v) a card, having edges and defined in said first thin polymer film layer (ii), said business form layer (i), and said second film layer (iii) by a diecut extending through said layers (i), (ii), and (iii) but not through said third thin polymer film layer (iv), wherein the card is provided with a pattern of selective variable adhesion through variable surface-treatment of the upper surface of said fourth layer (iv), the lower surface of layer (iii) or both of said surfaces in a pattern such that the adhesion at separable interface B is always less than the adhesion at permanently-bonded interface A.

In each of the preferred embodiments:

the pattern of the differential treated area extends under the card area defined by the diecut;

the polymer film layer or layers comprise a polyester film, 0.2 to 7 mils thick;

the business form layer comprises paper stock of 15 to 150 # weight;

the means for providing selective variable adhesion through variable surface treatment is selected from corona-treatment, flame-treatment, plasma-treatment, an obviously equivalent-treatment, or a combination of any of the foregoing treatments;

the treatment is carried out under conditions which produce a measurable differential of at least 1 dyne/cm. measured in a suitable apparatus, e.g. using a surface tension test fluid such as Accu Dyne Test Fluid from Diversified Enterprises, Claremont, N.H., USA, at the time of treatment;

the pattern of the treated area covers from at least about 10 to about 90 percent of the surface and the untreated area covers from at least about 90 to about 10 percent of the surface;

preferably the pattern of the treated area covers from at least about 40 to about 60 percent of the surface and the untreated area covers from at least about 60 to about 40 percent of the surface;

the treated area preferably comprises a repeating pattern;

the repeating pattern may comprise areas bounded by regular or irregular saw-tooth edges, a sine-wave pattern, a herring-bone pattern, a closed curve, a polygon, or any geometric shapes or obvious equivalents thereof; and the surface modification that is achieved by the surface treatment is based on the use of predetermined power level that is varied by increasing or decreasing the power of the treatment, by increasing or decreasing the exposure time of the treatment, or by increasing or decreasing the distance between the treatment source and the surface to which said treatment is applied.

In another of its major aspects, the present invention contemplates, a form with an integral clean release card, comprising:

(i) a business form layer of paper or polymer film having an upper surface and a lower surface;

(ii) optionally, a first thin polymer film layer, adhesively secured to the upper surface of said business form layer;

(iii) a second thin polymer film layer having an upper surface and a lower surface, the upper surface being permanently adhesively secured to the lower surface of said business form layer so as to provide the lower surface of the second film layer with a permanent interface A;

(iv) a third thin polymer film layer having an upper surface and a lower surface, the upper surface being adhesively secured, directly, or through an underlying thin coated layer to the lower permanently bonded interface A of said second thin polymer film layer (iii) at a separable interface B; and (v) a card, having edges and defined in said first thin polymer film layer (ii), said business form layer (i), and said second polymer film layer (iii) by a diecut extending through said layers (i), (ii), and (iii) but not through said third thin polymer film layer (iv), wherein the card is provided with a pattern of selective variable adhesion through variable treatment of the upper surface of said fourth layer (iv), the lower surface of layer (iii) or both of said surfaces in a pattern such that the adhesion at separable interface B is always less than the adhesion at permanently bonded interface A.

In another aspect of the invention, a programmable electronic tag also known as a transponder such as a radio frequency identification (RFID) transmitter is captured between layers of the lamination to produce a smart card or label for automatic identification and control.

RFID is based around radio or electromagnetic propagation which has the ability to allow energy to penetrate through paper or polymeric layers of a laminate to read a tag that may or may not be visible.

The basic RFID system consists of three components, an antenna or coil, a transceiver (with decoder) and a RF tag (also known as a transponder that is electronically programmed with information. The antenna emits radio signals to activate the tag and read or write data to it and acts as the conduit between the transponder (tag) and transceiver which controls the systems data acquisition and communication.

Active RFID tags are powered by an internal battery and can be typically read from and written to. Passive RFID tags operate without a separate external power source and obtain operating generated from the reader. Passive tags are much smaller, lighter and less expensive than active tags and have an extended operational lifetime but require shorter read ranges and a higher powered reader and generally are read only.

U.S. Pat. No. 5,448,110 to Tuttle hereby incorporated by reference discloses enclosed transceivers that are suitable for mass production in web sheet and tape formats or for use as stickers affixed to a device.

U.S. Pat. No. 5,497,140 to Tuttle discloses a miniature RFID system captured between layers for use as a postage stamp and the like.

Our invention differs from those of Tuttle where through differential treatment, we are providing a means for a device to be embedded between layers of the lamination of the invention providing a removable segment, card, coupon, tag or label with a smart embedded device. The device can be read or written at any time and can then subsequently be removed with the removable piece through differential treatment and subsequently re-read or written to through the useful life of the item.

The present invention also contemplates as a major aspect, a card intermediate, comprising:

(i) a business form layer of paper or film having an upper surface and a lower surface;

(ii) optionally, a first thin film layer, adhesively secured to the upper surface of said business form layer;

(iii) a second thin film layer having an upper surface and a lower surface, the upper surface being permanently adhesively secured to the lower surface of said business form layer; the lower surface of the second thin film layer being adhesively secured, directly, or through an underlying thin coated layer at a separable interface designated B to;

(iv) a third thin film layer having an upper surface and a lower surface, the upper surface being adhesively secured, directly, or through an underlying thin coated layer to the lower separable interface B of said second thin film layer (iii) at a permanent interface designated as interface A; and (v) a card, having edges and defined in said first thin film layer (ii), said business form layer (i), and said second film layer (iii) by a diecut extending through said layers (i), (ii), and (iii) but not through said third thin film layer (iv), wherein the card is provided with a pattern of selective variable adhesion through variable surface-treatment of the upper surface of said fourth layer (iv), the lower surface of layer (iii) or both of said surfaces in a pattern such that the adhesion at separable interface B is always less than the adhesion at permanent interface A.

The present invention also contemplates as a major aspect, a form with an integral clean release card, comprising:

(i) a business form layer of paper or film having an upper surface and a lower surface;

(ii) optionally, a first thin film layer, adhesively secured to the upper surface of said business form layer;

(iii) a second thin film layer having an upper surface and a lower surface, the upper surface being permanently adhesively secured to the lower surface of said business form layer; the lower surface of the second thin film layer being adhesively secured, directly, or through an underlying thin coated layer at a separable interface designated B to;

(iv) a third thin film layer having an upper surface and a lower surface, the upper surface being adhesively secured, directly, or through an underlying thin coated layer to the lower separable interface B of said second thin film layer (iii) at a permanent interface designated as interface A; and (v) a card, having edges and defined in said first thin film layer (ii), said business form layer (i), and said second film layer (iii) by a diecut extending through said layers (i), (ii), and (iii) but not through said third thin film layer (iv), wherein the card is provided with a pattern of selective variable adhesion through variable treatment of the upper surface of said fourth layer (iv), the lower surface of layer (iii) or both of said surfaces in a pattern such that the adhesion at separable interface B is always less than the adhesion at permanent interface A.

DETAILED DESCRIPTION OF THE INVENTION

When used herein and in the appended claims, the term "polymer substrate" includes, but is not limited to, a polymer film, foil or a coated polymer layer on the surface of another substrate such as paper, film or foil the polymer film can be opaque or transparent.

"Corona treatment" is a process consisting of a voltage source, electrode, a dielectric and ground. High voltage is applied to the electrode. Between the electrode and ground is a dielectric, comprised of the substrate, air and an insulator such as silicone or ceramic. The voltage buildup on the electrode ionizes the air in the electrode/substrate gap, causing the formation of highly energized corona which excites the air molecules, reforming them into a variety of free radicals which then bombard the substrate surface increasing it's polarity by distributing free bond sites across it. There are two basic types of treater designs; conventional which uses a dielectric covered roll and bare-roll which uses a dielectric covered electrode.

"Flame treatment" is a process where a lean gas mixture is burned and the excess oxygen is rendered reactive by the high temperature and like corona, it induces an ionized airstream which alters the surface of the substrate as it impinges on it.

"Plasma treatment" requires a partial vacuum where a gas is introduced into an evacuated chamber and ionized by a radio frequency (RF) field. The RF field excites the gas molecules creating a blend of neutral atoms and reactive radicals formed from free electrons which bombard the surface of the substrate causing (1) Ablation—which is the "cleaning" of the surface by removal of its outer molecular layer; (2) Crosslinking—interconnection of long chain molecules; (3) Activation—impartation of reactive molecules which in an oxygen rich atmosphere increase the surface energy of the substrate.

"Obviously equivalent" other methods of surface treatment contemplated include ozone, ultra-high frequency electrical discharge, UV or laser bombardment or any other process that alters the surface of the substrate to promote adhesion of coatings or adhesives. In the case of this invention, the treatment is performed in a pattern and the degree of surface treatment is used to control the release or adhesion characteristics, so there is always an easily separable edge of the card.

Differentially treated areas are defined as areas of treatment and no treatment or areas of higher treatment and lower treatment.

Referring to FIG. 1, card intermediate structure 10 is comprised of paper or polymer film 12 (printed or non-printed) to which optional film layer 14 is bonded by pressure sensitive- or dry laminating adhesive 16. Optionally, but preferably, laser printer-enhancing layer 18 is included. Next, to the bottom of the form layer 12 is a sub-laminate 11 attached through adhesive layer 20 and deadening layer 22. To complete the laminate 10, there are provided two additional film layers 24 and 28, respectively. At their adhesively-connected (layer 27) interface, one, the other or both of them have been provided with a patterned surface treatment, as better shown in FIG. 3, wherein differential treated areas 42 and 40 are elements of the pattern. Such a structure provides an easily separable interface to lift the card edge combined with differential separation properties sufficient to prevent pre-release of the card during normal handling and processing. This separable interface 26 is designated herein and in the appended claims as interface B. The permanent interface, 38, is designated herein and the appended claims as interface A. The differential separation is accomplished using patterned flame-, plasma- or corona-treating techniques, or obvious equivalents thereof.

Figure 2:
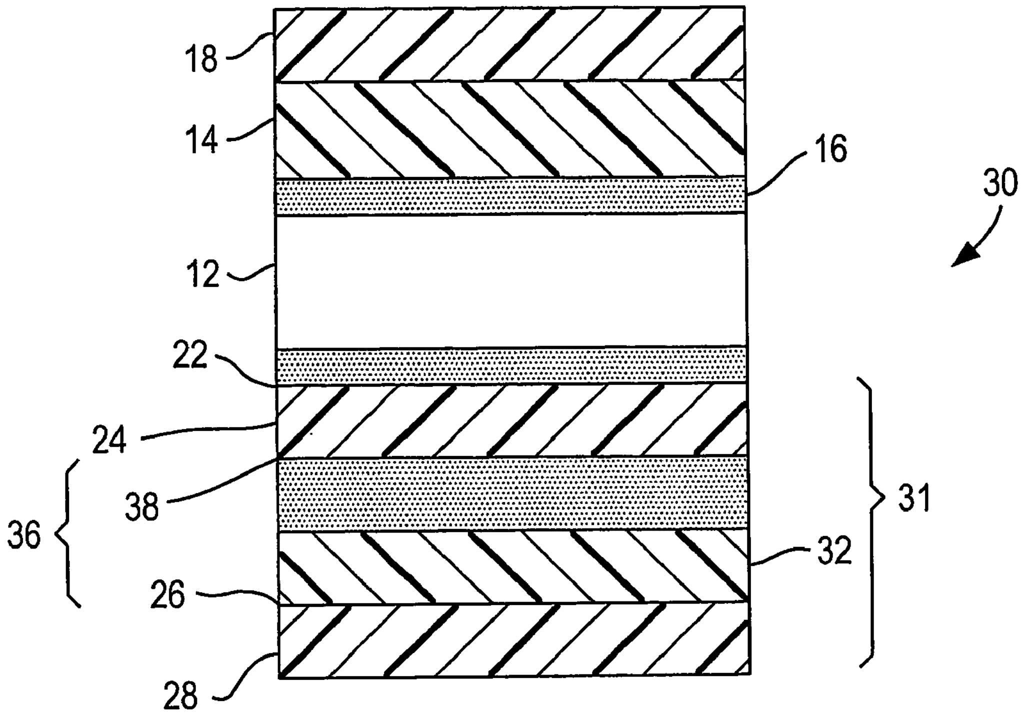
FIGS. 2 and 2A illustrate cross-sectional views of other card intermediates of the present invention.

Referring now to FIG. 2, this embodiment of the invention differs from the previous intermediate in the nature of the two polyester sub-laminate 31: polyesters 24 and 28, respectively, one, the other, or both carrying patterned treated surfaces, are adhesively bonded by adhesive 27 through an intermediate deadening or breakaway transfer layer 32, which preferably is a synthetic resin coating. Such a structure provides a separable interface with differential release properties of the releasable layer to allow for easy separation of the edge of the card in lower or non-treated areas with sufficient adhesion in higher treated areas to prevent pre-removal during handling and processing. The separable interface 26 is also designated herein and in the appended claims as interface B. The permanent interface, 38, is designated herein and the appended claims as interface A. This embodiment produces a differential adhesion removable portion of a form where the adhesive layer 27, and breakaway layer 32, (in combination denoted 36), transfers to the back of the card which is desirable for applying indicia and signature compatibility.

Figure 1A:
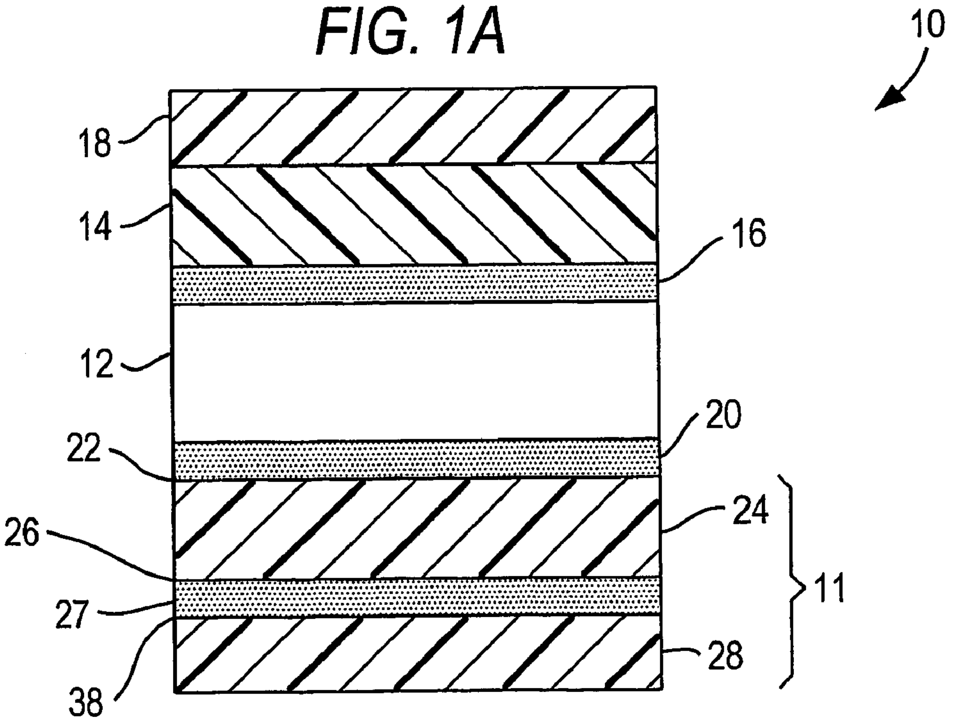
Figure 2A:
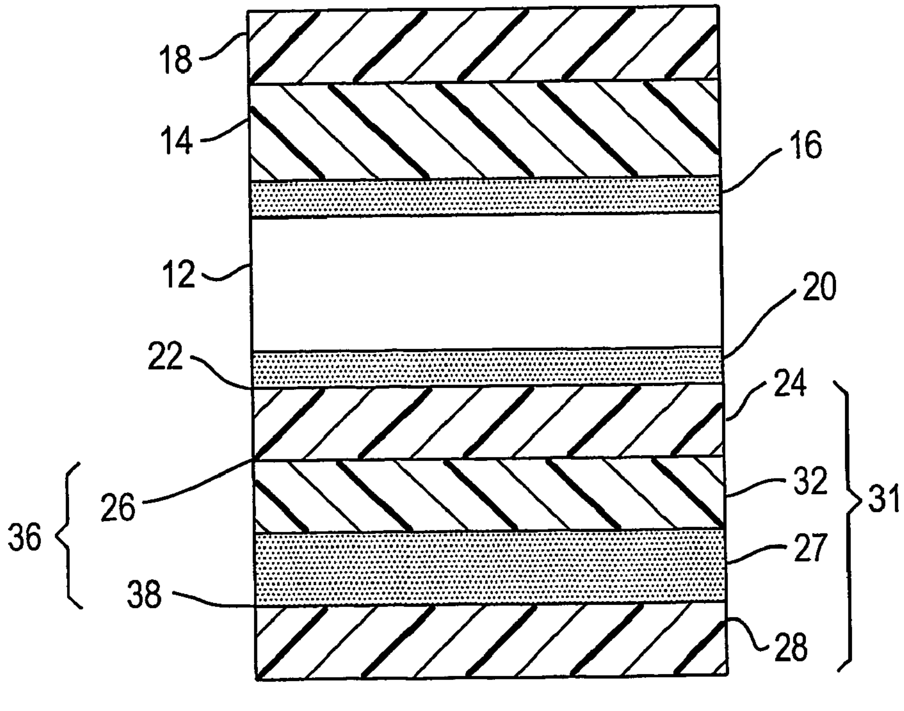

Referring now to FIGS. 1A and 2A, it is also contemplated that the adhesive 27, or adhesive with breakaway layer 32 (denoted in combination 36) could be made to transfer to the base layer that remains in the form using the same techniques where permanent interface A and separable interface B would switch locations in the laminate structure.

FIG. 1A illustrates such an embodiment:

Referring to FIG. 1A, card intermediate structure 10 is comprised of paper or film 12 to which optional film layer 14 is bonded by pressure sensitive- or dry laminating adhesive 16. Optionally, but preferably, laser printer-enhancing layer 18 is included. Next, to the bottom of the form layer 12 is a sub-laminate 11 attached through adhesive layer 20 and deadening layer 22. To complete the laminate 10, there are provided two additional film layers 24 and 28, respectively. At their adhesively-connected (layer 27) interface, one, the other or both of them have been provided with a patterned surface treatment, as better shown in FIG. 3. Such a structure provides an easily separable interface to lift the card edge combined with differential separation properties sufficient to prevent pre-release of the card during normal handling and processing. This separable interface 26 is designated herein and in the appended claims as interface B. The permanent interface, 38, is designated herein and the appended claims as interface A. The differential separation is accomplished using patterned flame-, plasma- or corona-treating techniques, or obvious equivalents thereof.

FIG. 2A also illustrates such an embodiment:

Referring now to FIG. 2A, this embodiment of the invention differs from the previous intermediate in the nature of the two polyester sub-laminate 31: polyesters 24 and 28, respectively, one, the other, or both carrying patterned treated surfaces, are adhesively bonded by adhesive 27 through an intermediate deadening or breakaway transfer layer 32, which preferably is a synthetic resin coating. Such a structure provides a separable interface with differential release properties of the releasable layer to allow for easy separation of the edge of the card in low or non-treated areas with sufficient adhesion in higher treated areas to prevent pre-removal during handling and processing. The separable interface 26 is also designated herein and in the appended claims as interface B. The permanent interface, 38, is designated herein and the appended claims as interface A. This embodiment produces a differential adhesion removable portion of a form where the adhesive layer 27, and breakaway layer 32, (in combination denoted 36) transfers to the remaining layer in the form 28.

Figure 3:
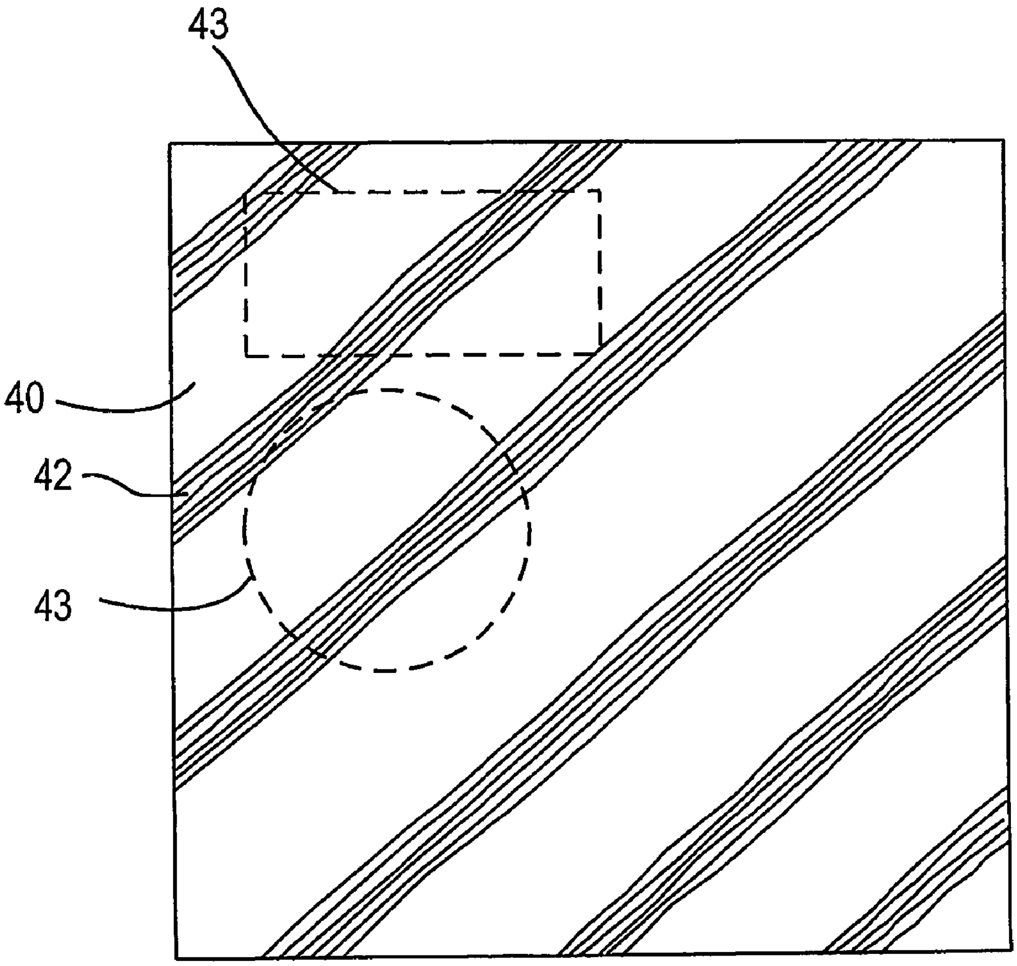
FIG. 3 shows a pattern formed by corona treatment of a sheet or roll, using a pierced system roller as schematically illustrated in FIG. 4. Diecut patterned segments can be provided as shown in phantom in FIG. 3.

FIG. 3, a schematic diagram is provided which denotes a specimen with treated areas 42 and untreated areas or areas of lesser treatment 40 which comprise elements of the pattern. Various diecut segments 43 are shown in phantom.

Figure 4:
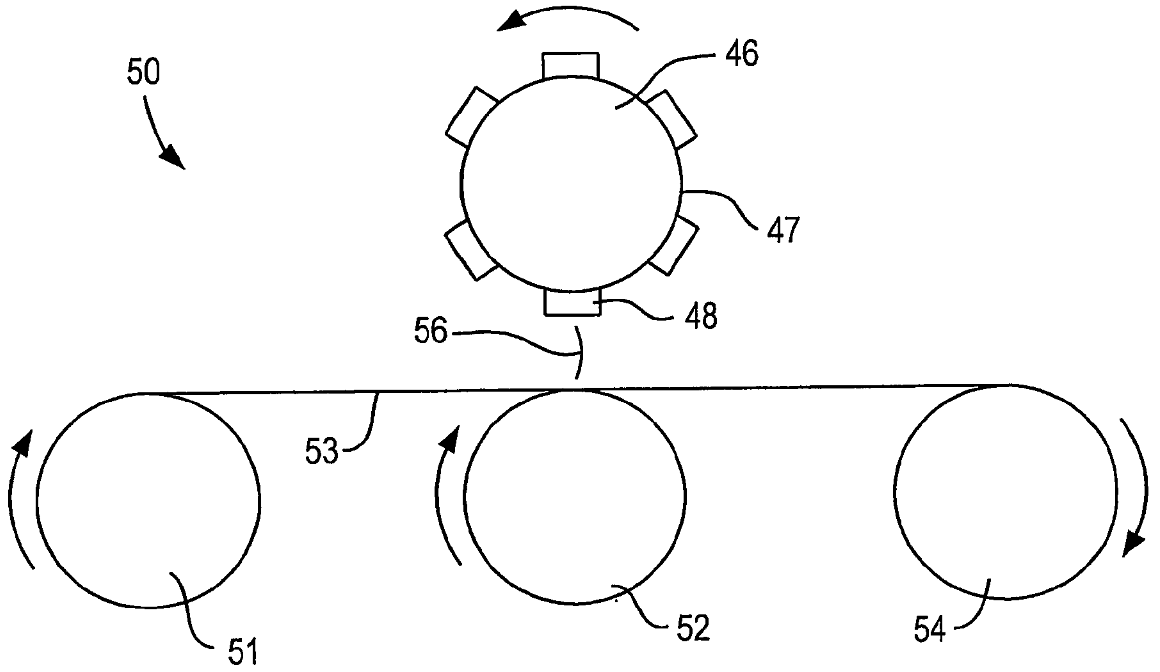

FIG. 4 this illustrates in flow diagram form a cross sectional view of an apparatus 50 for treating a web plastic film selectively patterned by corona energy 56 emitted by a roller machined into a pattern generating configuration by providing uninsulated sectors 48 separated by optionally insulated sectors 47 under the influence of grounded roller 52. It is important in securing uniform pattern development that the material 53 and roller 46 travel in synchronized speed. Those skilled in the art will recognize that treatment is influenced by the speed of the material 53, and rollers 52, and 46, the distance between the roller 52 and 48 and/or 47, and the power supplied to 46.

Whether the adhesive or adhesive with release, deadening or breakaway layer transfers to the form or the card is not a critical aspect of this invention though it is preferable to transfer to the back of the card for indicia application or signature compatibility. The differential surface treatment of areas on a layer of polymeric film to produce areas of easy separation to begin to remove the card combined with areas of tight separation to hold the card in the form during normal handling before it is removed by the consumer is the invention.

Many different polymeric films such as polyester, polypropylene, vinyl, polyethylene or combinations can be used to achieve the results of the invention based on the chemistry of the adhesive, breakaway fugitive layer, release or deadening layer in combination with the surface treatment level of the film layer(s). What is important is the differential adhesion achieved between a specific coating chemistry and the differential treated areas of a specific polymeric surface. For example some coatings will bond tenaciously to treated and non treated areas. Others will produce a permanent bond in both areas at certain treatment levels, all easily removable bonds at another and the desired differential adhesion that provides ease of edge lift with controlled separation at another treatment level. Fischer utilizes differential treatment on two different surfaces, one treated and one non treated surface to achieve permanent and peelable bonds while this invention uses controlled treatment in selective areas of one surface to achieve separability and controlled removability. The other permanent surface can be fully treated, not treated or pattern differential treated depending on the choice of material.

Once an easily separable area of a pattern treated surface is lifted or separated, the entire layer will continue to lift and the separation propagates through the treated areas. This can be likened to a roll of tape where it is difficult to start dispensing from the roll unless the leading edge can be easily separated. If not easily separated you pick at it with your fingernail until it is removed. The manufacturer typically reduces the tack at the starting edge for ease of separation using a lift tab to begin dispensing. Starting separation can be difficult in higher treated areas without differential, non-treated or lower treated areas to allow for separation which results in most cases in damage to the form or card during attempted separation. It has been found that the non treated areas or areas treated with less energy preferably should be from about 40 to about 60% of the surface area of the differential treated layer depending on the construction (stiffness) of the card but can range from about 10 to about 90%. These areas must extend under the die cut.

The determination of fitness for use is a practical one where laminations are made using different chemistries where the surfaces of one or both of the layers is treated in a pattern for a period of time. The duration of treatment or residence time under flame, plasma or corona along with variations in energy impinged on the surface of the film can vary the treatment level differential of the pattern and will lead to different results. It is important to the invention to control residence time and energy level for controlled separation tailored to specific chemistries otherwise the bond of the treated surface can become permanent as in Fischer.

Testing Procedures and Results

Laminates in accordance with the present invention are prepared, tested and compared with the following results:

EXAMPLE 1

A conventional web of non-surface-treated 144 gauge oriented PET polyester (1.44 mil) (available from Advanced Web Products, 529 Fifth Ave., NY, USA) was corona discharge treated at 100 ft/min. using a power supply (model No. AB6628) available from Pillar Technologies, Inc., Heartland, Wis., USA, and a modified corona treater (AB1977) which was designed to operate with a rotary electrode according to FIG. 4 using a pattern of lands and valleys as in FIG. 3 on a 45 degree angle across the running direction of the width of the material. The width of the treat area was 3⁄16 inches and the non-treat area was 3⁄16 inches.

A 100% surface treated web of 200 gauge oriented PET polyester was prepared using a power output of 0.4 KW and a corona discharge apparatus described above using a standard bare roll to treat the whole surface. This treated web was gravure coated with a modified carboxylated acrylic latex prepared as follows: 80 parts Hystrex V43 acrylic latex from B.F. Goodrich, 19 parts polyethylene 40 from Chemical Corp. of America, and 1 part Aziridine crosslinker from Adhesion Systems, Inc., Patterson, N.J., at a coat weight of 1.5-2.0 grams/1000 sq. in. on a dry coated base immediately following corona treatment and the resulting coated web was laminated at a 60 psi (140° F.) to the patterned treated web and was allowed to cure for 48 hours. Release tests in grams/inch of width were performed to peel the uncoated layer of the laminate from the coated layer with release of the dry adhesive from the pattern treated layer to the fully treated layer.

For comparative purposes, five additional samples were prepared using the same materials but varying the power output to the modified corona treater for the 1.44 mil. oriented PET polyester web.

Release values were determined on a conventional release tester set at a 180 degree peel angle using at 12 inches/minute. Release values are stated in a range from average low to average high value in Table I:

TABLE I

| Power Output KW | Release MD grams/in | Release TD grams/in |
|---|---|---|
| 0.01 | 26-34 | 24-35 |
| 0.02 | 38-47 | 36-44 |
| 0.03 | 52-58 | 50-58 |
| 0.04 | 66-75 | 63-74 |
| 0.05 | 88-102 | 83-96 |
| 0.06 | 110-126 | 108-124 |

MD = machine direction
TD = transverse direction

It was noteworthy that with this configuration, release values increase fairly uniformly as the power increases for the MD and TD tests.

The webs assembled by Example 1 are used as interlaminar sub-assemblies in producing assemblies such as those described in FIGS. 1, 2, 1*a* and 2*a* using conventional adhesives and conventional laminating conditions.

EXAMPLE 2

Non-surface-treated 65 gauge oriented PET polyester (0.65 mil) was corona discharge treated in a sine wave pattern continuously across a web using the modified corona treater described in Example 1. Using the power outputs set forth in Table II the amplitude of the sine wave was ¼ inch and the thickness of the electrode providing the treatment was 3⁄32 inch the frequency of the sine wave one-half inch running in the machine direction with a phase difference of one-half inch across the web.

A coating of a modified polyurethane available from Adhesion Systems, Patterson, N.J., AS37637 (19-21% solids; viscosity 100-500 cps) was immediately applied at a coat weight of 0.8 grams dry/1000 sq. in. immediately following treatment. The resulting coated web is laminated to a 100% surface treated layer of 65 gauge oriented PET polyester that was corona discharge treated at 0.4 KW power output using the apparatus of Example 1 using a standard bare roll adapted to treat the whole surface by using. The laminate was cured for 48 hours and peel tests in grams/inch of width were performed to peel the uncoated layer of the laminate from the coated layer with transfer of the breakaway coating from the pattern treated film to the fully treated film. Using a polyurethane laminating adhesive PD384-30 Adhesion Systems Inc. (38-40% solids; 20-200 CPS) mixed with 1% of a 100% solid polyfunctional azeredine cross-linker (AS316 Adhesion Systems Inc.).

For comparative purposes, the speed of the web of polyester, the power output to the corona pattern treater in KW was varied.

Release values were determined on a conventional release tester set at 180 degree peel angle and 12 inches/minute rate and repeated in Table II. Release values are stated in a range from average low to average high value Table II.

TABLE II

| Power Output KW | Release MD grams/in | Release TD grams/in |
|---|---|---|
| 0.01 | 14-20 | 15-42 |
| 0.02 | 26-35 | 14-52 |
| 0.03 | 46-54 | 15-58 |
| 0.04 | 62-84 | 16-77 |
| 0.05 | 91-114 | 15-91 |
| 0.06 | 118-145 | 16-117 |

MD = machine direction
TD = transverse direction

It is noteworthy that with the sine wave pattern running in the machine direction, release values increase as the power increases but the distribution is tighter because theoretically there is always approximately the same amount of treated surface area per inch of width. In the transverse direction, the distribution is wider because the gaps between the sine waves show easy release while the treated area shows increasing release values as power is increased as one checks across the sine wave in the TD direction rather than along the sine wave in the MD direction.

The webs assembled by Example 2 are used as interlaminar sub-assemblies in producing the removable coupons, segments and labels of the invention by entirely conventional techniques.

It should be recognized that different coatings, coat weights, patterns, power levels, substrates, speeds, etc. all contribute to the release characteristics and the above data presented for illustrative purposes only.

The patents, applications, publications and test methods mentioned above are incorporated herein by reference.

Many variations of the present invention will suggest themselves to those skilled in the art in light of the above detailed description. For example, instead of paper, synthetic paper can be used. Instead of polyester, polyolefins can be used. Instead of transparent film layers used as printed forms opaque film can be used to mask information buried in the card element such as a radio frequency transmitter. Instead of a polyurethane coating, a poly(ethylene vinyl acetate) resin can be used or clear or opaque adhesives or breakaway layers. Additionally, opaque adhesives, coatings and films can be used to mask printed indicia or an inserted item or items such as a radio frequency transmitter.

As used herein, the term "film" is used synonymously with term "polymer film".

All such obvious modifications are within the full intended scope of the appended claims.

The invention claimed is:

1. A card intermediate, comprising: (i) a business form layer of paper or film having an upper surface and a lower surface; (ii) optionally, a first thin film layer, adhesively secured to the upper surface of said business form layer; (iii) a second thin film layer having an upper surface and a lower surface, the upper surface being permanently adhesively secured to the lower surface of said business form layer; the lower surface of the second thin film layer having a permanent adhesive and being designated as permanent interface A; (iv) a third thin film layer having an upper surface and a lower surface, the upper surface being adhesively secured, directly, or through an underlying thin coated layer to the lower permanent interface A of said second thin film layer (iii) at a separable interface designated as interface B; and (v) a removable card, having edges and defined in said first thin film layer (ii), said business form layer (i) and said second film layer (iii) by a diecut extending through said layers (i),(ii), and (iii) but not through said third thin film layer (iv), wherein the card is formed by a die cut on a patterned treated area of selective variable adhesion through an adhesive and selective surface-treatment of a part of the area of the upper surface of said third layer (iv) with a corona, flame or plasma treatment or a combination thereof whereby the selective differential surface-treatment increases the adhesion in said part of the areas that are treated, as compared to areas where no surface treatment is applied such that the adhesion at separable interface B is always less than the adhesion at permanent interface A, said patterned treated area having alternating areas of easy and tight separation strength that extend under an area defined by said diecut and which covers from at least about 10 percent to about 90 percent of the surface of either the upper surface of said third layer (iv), the lower surface of layer (iii) or both of said surfaces said patterned treated area allowing for easy separation and removal of said removable card at any area of said form by lifting an edge of said card while maintaining sufficient adhesion to prevent pre-separation of said card.

2. An article as in claim 1, wherein the film layer or layers comprise a polyester film, 0.2 to 7 mils thick.

3. An article as in claim 1, wherein the business form layer comprises paper stock of 15 to 150 pound weight.

4. An article as in claim 1, wherein the means for providing selective variable adhesion through variable surface treatment is selected from corona-treatment, flame-treatment, plasma-treatment, or a combination of any of the foregoing treatments.

5. An article as in claim 4, wherein said treatment is carried out under conditions which produce a measurable difference in adhesion of at least 1 dyne/cm as measured at the time of treatment.

6. An article as in claim 1, wherein the pattern of the treated area covers from at least about 40 to about 60 percent of the surface and the untreated area covers from at least about 60 to about 40 percent of the surface.

7. An article as in claim 1, wherein pattern of the treated areas comprises a geometric form.

8. An article as in claim 7, wherein said geometric form is selected from a saw-tooth, a sine-wave, a herring-bone, a closed curve, and a polygon.

9. An article as in claim 1, wherein the surface tension of the surface treatment is set to a predetermined level by increasing or decreasing the power of the treatment, by increasing or decreasing the exposure time of the treatment, or by increasing or decreasing the distance between the treatment source and the surface to which said treatment is applied.

* * * * *